G. F. MARSTON.
COMBINED TIRE VALVE AND PRESSURE GOVERNOR.
APPLICATION FILED AUG. 19, 1916.
1,246,131. Patented Nov. 13, 1917.
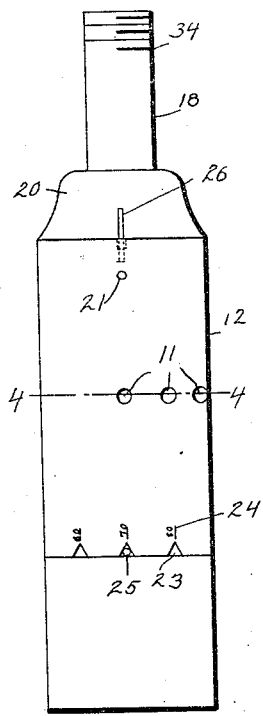
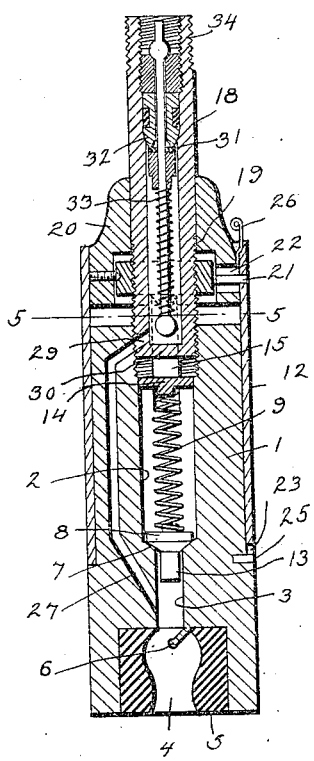
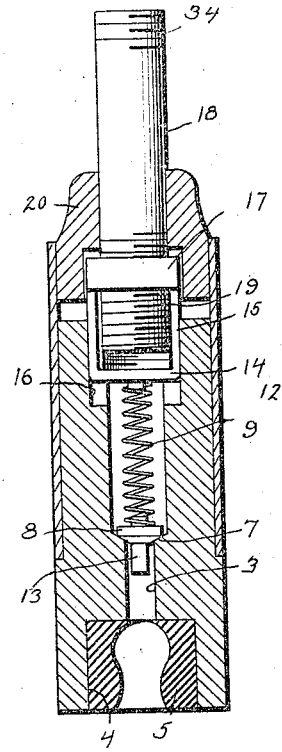
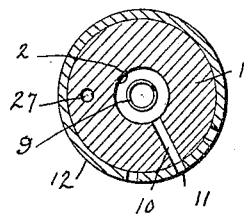
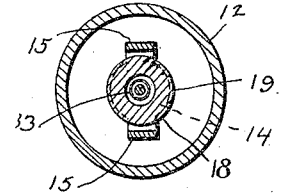
Inventor
G. F. Marston

UNITED STATES PATENT OFFICE.

GEORGE F. MARSTON, OF POMONA, CALIFORNIA.

COMBINED TIRE-VALVE AND PRESSURE-GOVERNOR.

1,246,131.  Specification of Letters Patent.  Patented Nov. 13, 1917.

Application filed August 19, 1916. Serial No. 115,340.

*To all whom it may concern:*

Be it known that I, GEORGE F. MARSTON, a citizen of the United States, residing at Pomona, in the county of Los Angles and State of California, have invented certain new and useful Improvements in Combined Tire-Valves and Pressure-Governors; and I do hereby declare the following to be a full, clear, and exact description of the invention, such as will enable others skilled in the art to which it appertains to make and use the same.

The invention relates to a combined tire valve and pressure governor.

The object of the present invention is to provide a simple, practical, and efficient combined tire valve and pressure governor adapted to be readily applied to automobile and similar pneumatic tire air valves and capable of enabling a compressed air pipe or air compressor to be readily connected with such tire valve and equipped with means for enabling the desired amount of pressure to be supplied to the tire and for indicating when such pressure has been reached so that the pneumatic tires will not be excessively inflated.

A further object of the invention is to provide a combined tire valve and pressure governor of this character adapted to be adjusted and set for different pressures and capable of permitting an escape of air after a tire has been inflated to the desired pressure so that such escape of air will serve as an audible signal and also as a relief.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing

Figure 1 is a side elevation of a combined tire valve and pressure governor constructed in accordance with this invention, Fig. 2 is a central longitudinal sectional view of the same, Fig. 3 is a longitudinal sectional view taken at right angles to Fig. 2, Fig. 4 is a transverse sectional view on the line 4—4 of Fig. 1, Fig. 5 is a transverse sectional view on the line 5—5 of Fig. 2.

Like numerals of reference designate corresponding parts in the several figures of the drawing.

In the accompanying drawing in which is illustrated the preferred embodiment of the invention, the combined tire valve and pressure governor comprises in its construction a substantially cylindrical body 1 constructed of suitable metal or other material and having a longitudinal bore or opening 2 which is connected by a reduced portion 3 with a lower valve receiving socket 4 containing a rubber washer or gasket 5. The rubber washer or gasket 5 is adapted to fit around an ordinary pneumatic tire air valve for making an air tight connection, and the said body 1 is provided at the top of the socket 4 with a projecting portion or knob 6 adapted to engage and depress the valve stem of the air valve for opening the same to permit a free passage of air from a compressor or other source of supply into the valve of the tire. The longitudinal bore or opening 2 constitutes a valve chamber and the bottom wall is beveled at 7 around the upper end of the reduced portion or extension 3 to form a seat for a valve 8 which is normally held closed by a coiled spring 9. The valve chamber is provided above the valve seat with an outlet consisting of a perforation 10 formed in the body 1 and adapted to register with the perforation 11 of a sleeve 12 adjustable on the body 1 and having a plurality of the said perforations 11 so that one of the said perforations 11 will always register with the perforation 10 in each adjustment of the sleeve. The valve 8 is provided with a depending stem 13 extending into the reduced passage 3 and while it is shown solid it may consist of wings or be constructed in any other desired manner.

The spring 9 is engaged by a plate or member 14 located within the upper portion of the valve chamber and provided at opposite sides with arms 15 operating in opposite slots or grooves 16 of the body 1 and arranged in the path of and adapted to be engaged by an adjusting nut 17. The adjusting nut 17 is mounted on a stem or tubular member 18 which has a lower threaded portion that is screwed into the upper portion of the longitudinal bore or valve chamber. The stem or tubular member 18 is provided at a point intermediate of its ends with threads 19 coacting with the adjusting nut 17 and adapted to permit the same to be screwed inwardly and outwardly to vary the tension of the spring and the pressure exerted by the same on the valve 8. When the nut 17 is adjusted inwardly on the stem 18 it is adapted to engage the arms of the plate or member 14 and force the latter inwardly and compress and thereby increase the tension of the spring 9, and an outward movement of the nut 17 on the stem 18 releases the spring pressure and reduces the same by permitting the plate or member 14 to move outwardly under the influence of spring pressure. The nut is preferably secured to and carried by a cap 20, to which the indicating sleeve is slidably connected by a pin 21 operating in a slot 22. The pin 21 is preferably carried by the indicating sleeve and the slot is formed in the cap 20 but the parts may be reversed and any other suitable means may be employed for slidably connecting the slidable indicating sleeve with the nut that is carried by the cap. The indicating sleeve is provided in its lower edge with a plurality of notches 23 and graduations 24 and the notches are adapted to engage the fixed pin or projection 25 and is normally maintained in engagement with the same by a catch 26 mounted on the cap sleeve and adapted to engage the slidable indicating sleeve at the upper end thereof. The catch is adapted to be depressed to enable the sliding sleeve to be moved upwardly or outwardly a sufficient distance to disengage it from the fixed pin or projection 25 of the body 1 to enable the sleeve and the nut to be rotated for adjusting the pressure spring.

The body 1 is provided with a passage 27 extending around the valve 8 and connected at the lower or inner end with the passage or reduced extension 3 of the valve chamber or bore 9 and communicating at its outer end with the interior of the tubular member or stem 18 through a registering perforation 29.

The tubular member or stem 18 has a lower end wall 30. The stem 18 is provided with a valve seat 31 which coacts with a valve 32 normally held against the seat by a spring 33 to prevent escape of air from the tire. The valve is of the ordinary construction and operates similar to the air valve of a pneumatic tire and the stem is exteriorly threaded at the outer end at 34 to enable it to be readily connected with a flexible tube of an air compressor or other source of compressed air supply. When the device is placed on a valve of a pneumatic tire the valve of the tire will be opened and the compressed air will flow freely into the tire and will be prevented from escaping by the valve 32. When the required pressure has been reached the air will escape past the valve 8 and out through the openings 10 and 11 with a whistling sound and notify the user that the tire is inflated to the required pressure. While the combined valve and pressure governor is designed principally for use in connection with pneumatic tires it may be employed for analogous purposes as will be readily understood.

What is claimed is:—

1. A combined valve and pressure governor of the class described including a body having a valve chamber and provided with a valve seat, said body being also provided with an air passage extending around the valve seat, a valve located in the valve chamber and coacting with the valve seat, a spring for holding the valve normally closed, a nut for adjusting the tension of the said spring, a sliding sleeve connected with the nut and arranged on the body, said body and sleeve having graduated coacting interlocking means for holding the sleeve and the nut against rotary movement.

2. A combined valve and pressure governor of the class described including a body having a valve chamber and provided with a valve seat, said body being also provided with an air passage extending around the valve seat, a valve located in the valve chamber and coacting with the valve seat, a spring for holding the valve normally closed, a nut for adjusting the tension of the said spring, a sliding sleeve connected with the nut and arranged on the body, said body and sleeve having graduated coacting interlocking means for holding the sleeve and the nut against rotary movement, and a catch for locking the sleeve against sliding movement.

3. A combined valve and pressure governor of the class described including a body having a valve chamber and provided with a valve seat, said body being also provided with an air passage extending around the valve seat, a valve located in the valve chamber and coacting with the valve seat, a spring for holding the valve normally closed, a nut for adjusting the tension of the said spring, a sliding sleeve connected with the nut and arranged on the body, said body and sleeve having graduated coacting interlocking means for holding the sleeve and the nut against rotary movement, means for locking the sleeve against sliding movement.

4. A combined valve and pressure governor of the class described including a body having a valve chamber and provided with a valve seat, said body being also provided with an air passage extending around the valve seat, a valve located in the valve chamber and coacting with the valve seat, a spring for holding the valve normally closed, a cap carrying the nut, a sleeve slidably connected with and carried by the cap, said sleeve being provided with graduated notches at its inner end, a fixed projection mounted on the body and arranged to engage the notches for locking the sleeve against rotary movement and a catch carried by the said cap and arranged to engage the outer end of the sleeve for holding the said sleeve in engagement with the fixed projection.

5. A combined valve and pressure governor of the class described including a body having a socket at one end and provided with valve stem engaging means, said body being also provided with a valve chamber communicating with the socket and having a valve seat, a valve coacting with the valve seat, a spring engaging the valve, a washer fitted against the outer end of the spring and having arms operating in the body, a threaded valve mounted on the body and having a passage communicating with the said socket, a nut mounted on the threaded stem and arranged to engage the arms of the washers and means for operating the nut.

6. A combined valve and pressure governor of the class described including a body having a bore or opening constituting a valve chamber and provided at its inner end with a valve seat, a tubular stem secured in the outer end of the said bore, a valve coacting with the said valve seat, a spring engaging the valve, a washer engaging the upper end of the spring and provided with an arm or extension, a nut mounted on the tubular stem and arranged to engage the said arm or extension for compressing the spring, a valve located within the tubular member for preventing the escape of air from the device, said body having an air passage controlled by the valve of the tubular stem or member and extending around the valve of the body.

In testimony whereof I affix my signature in presence of two witnesses.

GEORGE F. MARSTON.

Witnesses:
WM. DOUGHERTY,
L. S. ANDREW.